United States Patent
Cleboski et al.

(10) Patent No.: US 9,169,696 B2
(45) Date of Patent: Oct. 27, 2015

(54) CUTTING STRUCTURES, EARTH-BORING TOOLS INCLUDING SUCH CUTTING STRUCTURES, AND RELATED METHODS

(75) Inventors: Christopher J. Cleboski, Houston, TX (US); Juan Miguel Bilen, The Woodlands, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 557 days.

(21) Appl. No.: 13/312,576

(22) Filed: Dec. 6, 2011

(65) Prior Publication Data

US 2013/0140096 A1   Jun. 6, 2013

(51) Int. Cl.

| E21B 10/36 | (2006.01) |
|---|---|
| E21B 10/43 | (2006.01) |
| E21B 10/54 | (2006.01) |
| B23K 31/02 | (2006.01) |
| E21B 10/573 | (2006.01) |
| E21B 10/567 | (2006.01) |
| E21B 10/633 | (2006.01) |

(52) U.S. Cl.
CPC .............. *E21B 10/43* (2013.01); *B23K 31/025* (2013.01); *E21B 10/54* (2013.01); *E21B 10/5676* (2013.01); *E21B 10/573* (2013.01); *E21B 10/633* (2013.01); *Y10T 29/49826* (2015.01)

(58) Field of Classification Search
CPC . E21B 10/573; E21B 10/5735; E21B 10/567; E21B 10/5676; E21B 10/633
USPC .......................... 175/413, 428, 431, 426, 432
See application file for complete search history.

(56) References Cited

U.S. PATENT DOCUMENTS

| 3,106,973 | A | | 10/1963 | Christensen |
|---|---|---|---|---|
| 4,128,136 | A | | 12/1978 | Generoux |
| 4,200,159 | A | * | 4/1980 | Peschel et al. ............... 175/428 |
| 4,255,165 | A | | 3/1981 | Dennis et al. |
| 4,686,080 | A | | 8/1987 | Hara et al. |
| 5,025,871 | A | * | 6/1991 | Stewart et al. .................. 175/57 |

(Continued)

FOREIGN PATENT DOCUMENTS

WO   2009042659 A1   4/2009

OTHER PUBLICATIONS

International Preliminary Report on Patentability for International Application No. PCT/US2012/068072 dated Jun. 10, 2014, 8 pages.

(Continued)

*Primary Examiner* — Nicole Coy
(74) *Attorney, Agent, or Firm* — TraskBritt (57) ABSTRACT

Earth-boring tools comprise a body comprising at least one pocket extending into the body. A first discrete cutting element segment is secured within the at least one pocket. At least another discrete cutting element segment is secured within the at least one pocket. Methods of forming a cutting structure secured to an earth-boring tool comprise disposing at least one discrete cutting element or at least one cutting element segment within a pocket or recess formed in a blade extending longitudinally and radially over a face of a body. At least one discrete wearable element or at least another discrete cutting element segment is disposed within the pocket or recess. The at least one discrete cutting element or at least one discrete cutting element segment and the at least one discrete wearable element or at least another discrete cutting element segment are secured to the blade within the pocket or recess.

12 Claims, 9 Drawing Sheets

(56) References Cited

U.S. PATENT DOCUMENTS

| | | | |
|---|---|---|---|
| 5,090,491 A | | 2/1992 | Tibbitts et al. |
| 5,099,935 A | * | 3/1992 | Anthon et al. ............... 175/426 |
| 5,147,001 A | | 9/1992 | Chow et al. |
| 5,282,513 A | | 2/1994 | Jones |
| 5,333,699 A | | 8/1994 | Thigpen |
| 5,887,668 A | | 3/1999 | Haugen et al. |
| 5,979,578 A | | 11/1999 | Packer |
| 6,095,265 A | | 8/2000 | Alsup |
| 6,742,611 B1 | | 6/2004 | Illerhaus |
| 7,070,011 B2 | * | 7/2006 | Sherwood et al. ............ 175/432 |
| 7,216,565 B2 | * | 5/2007 | Sherwood et al. ............ 76/108.1 |
| 7,520,345 B2 | * | 4/2009 | Sherwood et al. ............ 175/432 |
| 7,841,259 B2 | | 11/2010 | Smith et al. |
| 7,909,121 B2 | * | 3/2011 | Voronin et al. ............... 175/435 |
| 8,065,935 B2 | * | 11/2011 | Sherwood et al. ............ 76/108.1 |
| 8,672,061 B2 | * | 3/2014 | Voronin et al. ............... 175/432 |
| 2006/0254830 A1 | | 11/2006 | Radtke |
| 2007/0158115 A1 | * | 7/2007 | Sherwood et al. ............ 175/432 |
| 2008/0223622 A1 | | 9/2008 | Duggan et al. |
| 2010/0000798 A1 | | 1/2010 | Patel |
| 2010/0219001 A1 | | 9/2010 | Shen et al. |
| 2010/0307829 A1 | | 12/2010 | Patel |
| 2010/0314176 A1 | * | 12/2010 | Zhang et al. ................. 175/383 |

OTHER PUBLICATIONS

International Search Report for International Application No. PCT/US2012/068072 dated Mar. 13, 2013, 3 pages.

International Written Opinion for International Application No. PCT/US2012/068072 dated Mar. 13, 2013, 7 pages.

* cited by examiner

CUTTING STRUCTURES, EARTH-BORING TOOLS INCLUDING SUCH CUTTING STRUCTURES, AND RELATED METHODS

FIELD

Embodiments of the disclosure relate generally to cutting structures for earth-boring tools and methods of forming cutting structures for earth-boring tools. Specifically, disclosed embodiments relate to cutting structures formed of discrete cutting element segments or of discrete cutting elements and discrete wearable elements.

BACKGROUND

Earth-boring tools for forming wellbores in subterranean earth formations may include a plurality of cutting elements secured to a body include, such as, for example, fixed-cutter earth-boring rotary drill bits (also referred to as "drag bits"). Such fixed-cutter bits include a plurality of cutting elements that are fixedly attached to a bit body of the drill bit, conventionally in pockets formed in blades and other exterior portions of the bit body. Other earth-boring tools may include rolling cone earth-boring drill bits, which include a plurality of roller cones attached to bearing pins on legs depending from a bit body. The roller cones may include cutting elements (sometimes called "teeth") milled or otherwise formed on the roller cones, which may include hardfacing on the outer surfaces of the cutting elements, or the roller cones may include cutting elements (sometimes called "inserts") attached to the roller cones, conventionally in pockets formed in the roller cones.

The cutting elements may be placed in the pockets in a variety of ways. For example, cutting elements may be front-loaded or top-loaded into the pockets. U.S. Patent Application Pub. No. 2008/0223622, published Sep. 18, 2008, to Duggan et al., the disclosure of which is hereby incorporated herein by reference, discloses placing cutting elements in pockets by top-loading. Briefly, a cutting element top-loaded into a pocket may be disposed over the pocket and lowered into the pocket, similar to the way bread may be lowered into a toaster. Typically, top-loading requires that the uppermost portion of the pocket be as large as, or larger than, the cutting element to permit the cutting element to enter the pocket from above. U.S. Pat. No. 5,333,699, issued Aug. 2, 1994, to Thigpen et al., the disclosure of which is incorporated herein in its entirety by this reference, discloses placing cutting elements in pockets by front-loading. Briefly, a cutting element front-loaded into a pocket may be aligned with a rotationally leading opening of the pocket and slid into the pocket, similar to the way a bullet may be slid into the chamber of a conventional revolver. Frequently, front-loading involves aligning a central axis of a cylindrical cutting element with a central axis of a complementarily cylindrical pocket and sliding the cutting element into the pocket.

Front-loading cutting elements may be difficult or impossible in some configurations, such as, for example, where a distance between two rotationally adjacent blades is smaller than the overall thickness of the cutting elements and the angle at which the cutting elements are inserted into the pockets does not permit the cutting elements to clear rotationally leading blades while being inserted into the pockets of rotationally following blades. In other words, narrow junk slots between adjacent blades may not permit cutting elements to enter the junk slots for front-loading into pockets that have openings into those junk slots. In such situations, cutting elements having a relatively small thickness or large back rake angles may be used to permit the cutting elements to be front-loaded. However, such approaches may shorten the useful life of the cutting elements in the first instance due to the relatively small volume of cutting element material or, in the second instance reduce the rate of penetration because of the relatively passive engagement of the cutting elements with the earth formation.

BRIEF DESCRIPTION OF THE DRAWINGS

While the specification concludes with claims particularly pointing out and distinctly claiming what are regarded as embodiments of the present invention, various features and advantages of example embodiments may be more readily ascertained from the following description when read in conjunction with the accompanying drawings, in which:

DETAILED DESCRIPTION

The illustrations presented herein are not meant to be actual views of any particular cutting element, earth-boring tool, or component thereof, but are merely idealized representations that are employed to describe example embodiments. Thus, the drawings are not necessarily to scale and relative dimensions may have been exaggerated or understated for the sake of clarity. Additionally, elements common between figures may retain the same or similar numerical designation.

Disclosed embodiments relate to cutting structures formed of discrete cutting element segments or of discrete cutting elements and discrete wearable elements. In some embodiments, discrete cutting element segments having a thickness less than a distance between rotationally adjacent blades may be inserted into a pocket to form a cutting structure having an overall thickness greater than the distance between rotationally adjacent blades.

The terms "earth-boring tool" and "earth-boring drill bit," as used herein, mean and include any type of bit or tool used for drilling during the formation or enlargement of a wellbore in a subterranean formation and include, for example, fixed-cutter bits, rolling cone bits, impregnated bits, core bits, eccentric bits, bicenter bits, hybrid bits as well as reamers, mills, and other drilling bits and tools known in the art.

As used herein, the term "polycrystalline material" means and includes any structure comprising a plurality of grains (i.e., crystals) of material (e.g., superhard material) that are bonded directly together by inter-granular bonds. The crystal structures of the individual grains of the material may be randomly oriented in space within the polycrystalline material.

As used herein, the terms "inter-granular bond" and "inter-bonded" mean and include any direct atomic bond (e.g., covalent, metallic, etc.) between atoms in adjacent grains of superabrasive material.

As used herein, the term "superhard material" means and includes any material having a Knoop hardness value of about 3,000 Kg/mm$^2$ (29,420 MPa) or more. Superhard materials include, for example, diamond and cubic boron nitride. Superhard materials may also be characterized as "superabrasive" materials.

As used herein, the term "tungsten carbide" means and includes any material composition that contains chemical compounds of tungsten and carbon, such as, for example, WC, W$_2$C, and combinations of WC and W$_2$C. Tungsten carbide includes, for example, cast tungsten carbide, sintered tungsten carbide, and macrocrystalline tungsten carbide.

As used herein, the term "diamond" means and includes any material composition that contains an allotrope of carbon wherein the carbon atoms are arranged in a diamond lattice structure. Diamond includes, for example, natural and synthetic diamonds and polycrystalline and monocrystalline diamond.

Figure 1:
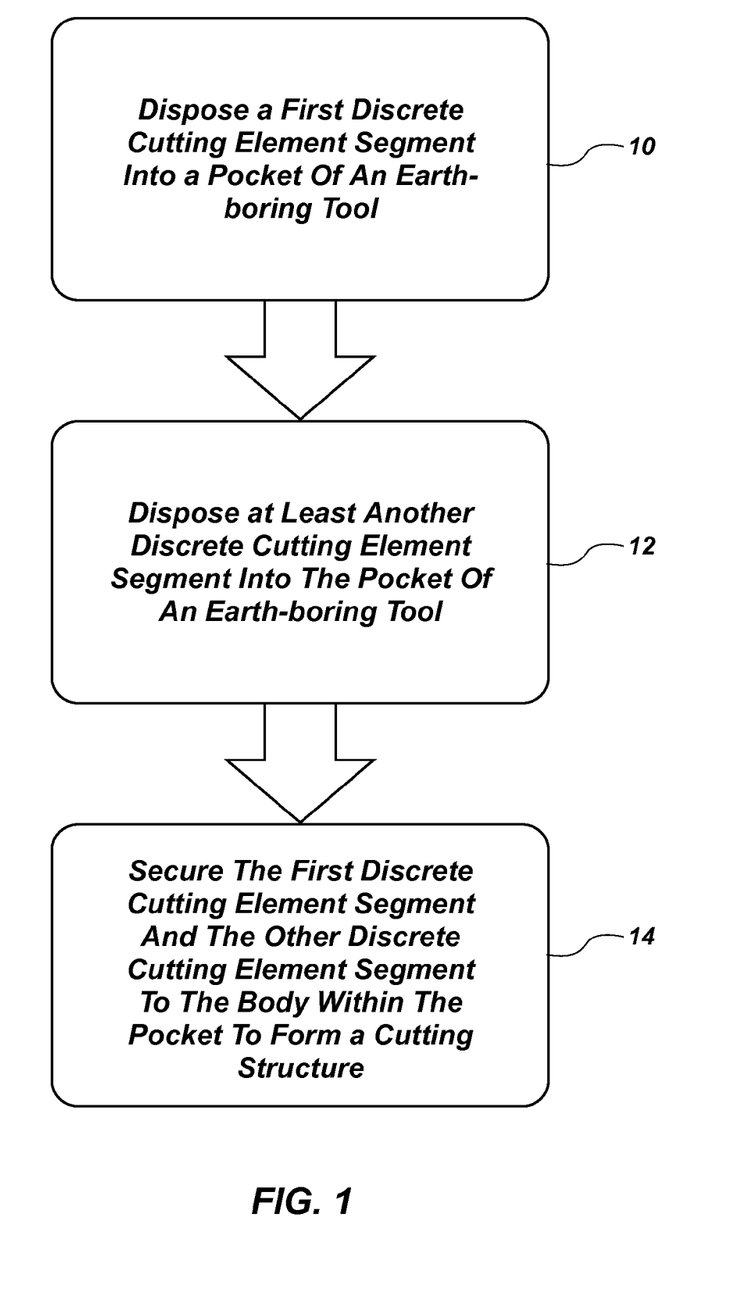
FIG. 1 is a schematic showing acts in a process of forming a cutting structure secured to an earth-boring tool.

FIG. 1 is a schematic showing acts in a process of forming a cutting structure secured to an earth-boring tool. As reflected at 10, a first discrete cutting element segment may be disposed (e.g., front-loaded) into a pocket extending into a body. As shown at 12, at least another discrete cutting element segment may be disposed (e.g., front-loaded) into the pocket. As depicted at 14, the first discrete cutting element segment and the at least another cutting element segment may be secured to the body within the pocket to form a cutting structure. Such acts, in addition to other acts that may be performed when forming a cutting structure secured to an earth-boring tool, are described in more detail with reference to the following drawings.

Figure 2:
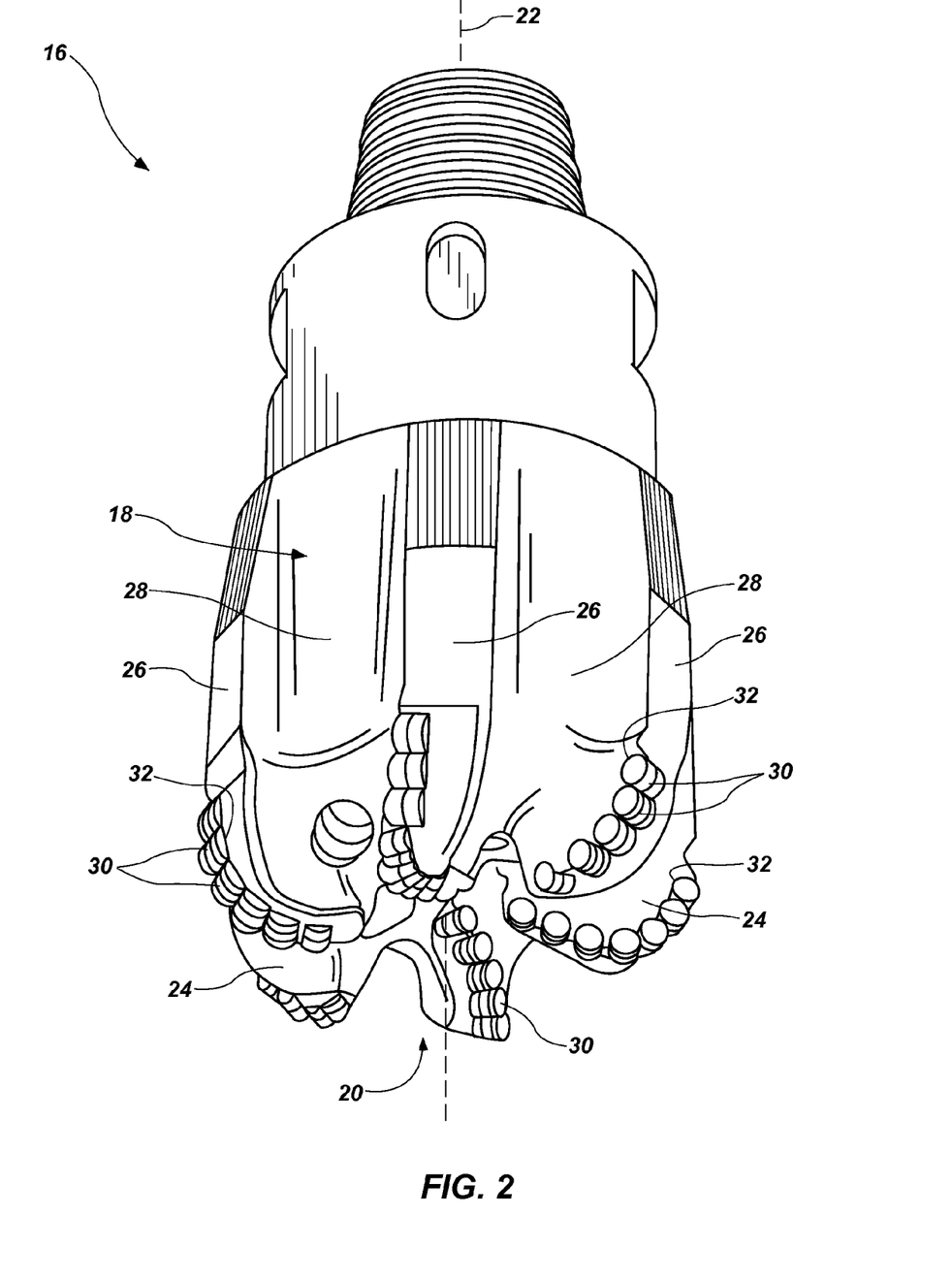
FIG. 2 is a perspective view of an earth-boring drill bit.

Referring to FIG. 2, a perspective view of an earth-boring drill bit 16 is shown. The earth-boring drill bit 16 includes a bit body 18 having a face 20 at a leading end of the earth-boring drill bit 16 and a longitudinal axis 22 (e.g., an axis of rotation, an axis of rotational symmetry, or an axis along a geometric center) extending through the bit body 18. Blades 24 may extend longitudinally downward from the face 20 and radially outward over the face 20. In other words, the blades 24 may comprise protrusions from the face 20 that extend outward, like spokes of a wheel, over the face 20. The blades 24 may extend longitudinally upward away from the face 20 to a gage region 26, which may define an outermost diameter of the earth-boring drill bit 16. Junk slots 28 may be formed by the spaces defined between adjacent blades 24, and cuttings may be carried away from the face 20 through the junk slots 28 as the earth-boring drill bit 16 is rotated in a borehole. Though the earth-boring drill bit 16 is shown as having six blades 24, any number of blades 24 having any thickness may extend from the face 20, and the angular distance between rotationally adjacent blades 24 may vary accordingly. Specifically, as the number of blades 24 is increased and as the thickness of the blades 24 is increased (i.e., the angular distance occupied by the structure of a single blade 24), the junk slots 28 may be correspondingly narrower. Cutting structures 30 may be fixedly attached to the blades 24. More specifically, the cutting structures 30 may be secured within pockets 32 formed in the blades 24. The cutting structures 30 may be configured to engage and remove an underlying earth formation primarily through a shearing or scraping cutting mechanism.

Figure 3:
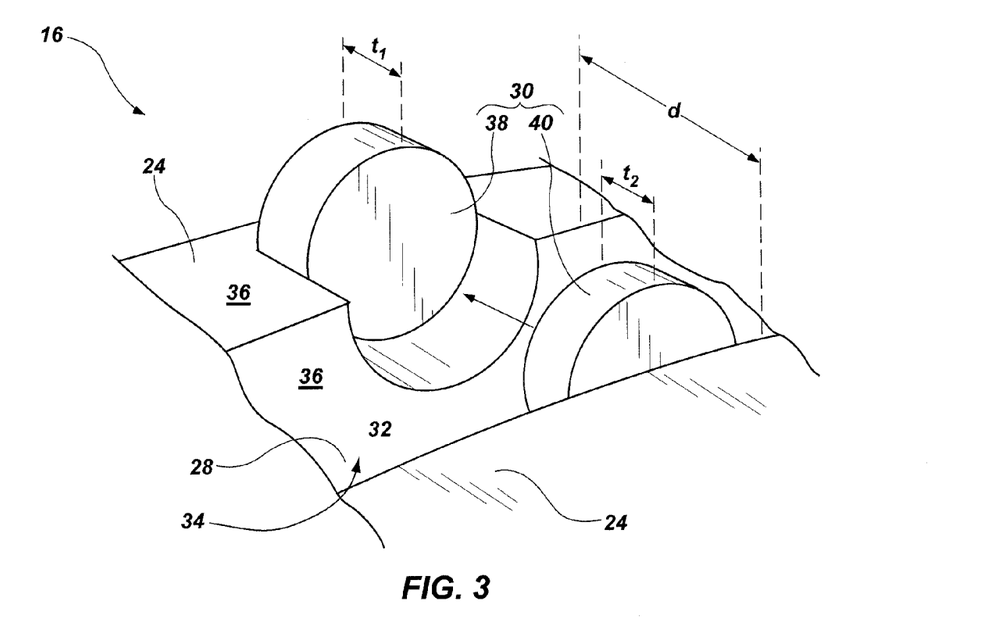
FIG. 3 is a perspective view of a portion of the drill bit of FIG. 2 during insertion of components of a cutting structure.

Referring to FIG. 3, a portion of the drill bit 16 of FIG. 2 during insertion of components of a cutting structure 30 is shown. Prior to insertion of the cutting structure 30, the pockets 32 may be formed in the body of the blade 24. The pockets 32 may be configured to receive a cutting structure 30 by front-loading. Specifically, the pockets 32 may extend into the body of the blade 24 from a rotationally leading surface 34 of the blade 24. The pockets 32 may also extend into the body of the blade 24 from a formation-facing surface 36 of the blade 24. When it is said that the surface 36 is formation-facing, it is meant that the surface 36 faces the underlying earth formation when the earth-boring drill bit 16 is disposed in a borehole, though the formation-facing surface 36 may face away from the earth when the earth-boring drill bit 16 is not located in a borehole. Thus, the rotationally leading surface 34 and the formation-facing surface 36 of the blade 24 may be intermittently interrupted by openings into the pockets 32 extending into the blades 24. The pockets 32 may be configured to receive an at least substantially cylindrical structure, and may comprise cylindrical cavities intersected by the rotationally leading surface 34 and the formation-facing surface 36 to truncate the otherwise cylindrical shape of the pockets 32. Such a pocket 32 may be configured to receive greater than half of a volume of a cutting structure 30 in the pocket 32 in some embodiments. For example, a cross-sectional shape of the pocket 32 at the rotationally leading surface 34 may form a partial circle greater than half of a circle; in other words an arc of greater than 180°. In such embodiments, top-loading of a cutting structure 30 into the pocket 32 may be difficult or impossible because the diameter of the cutting structure 30 may be greater than an opening of the pocket 32 at the formation-facing surface 36. Thus, the pocket 32 may be configured to receive a cutting structure 30 only by front-loading (i.e., moving in a direction perpendicular to the rotationally leading surface 34) in some embodiments. In other embodiments, the pocket 32 may be configured to receive a cutting structure by front-loading and by top-loading. For example, a cross-sectional shape of the pocket 32 at the rotationally leading surface 34 may be a half-circle or less than half of a circle, which may enable a cutting structure to pass into the pocket 32 by moving in a direction perpendicular to the formation-facing surface 36.

The pockets 32 may be formed using conventional processes. For example, pockets 32 may be machined into the blades 24, as disclosed in U.S. Pat. No. 5,333,699, issued Aug. 2, 1994, to Thigpen et al., and as disclosed in U.S. Patent Application Pub. No. 2008/0223622, published Sep. 18, 2008, to Duggan et al., the disclosure of each of which is incorporated herein in its entirety by this reference. In addition or in the alternative, pockets 32 may be formed during formation of the bit body 18, such as, for example, by placing displacements (e.g., cylindrical displacements) at locations for the pockets 32 in a mold, forming the bit body 18 and the blades 24 in the mold around the displacements, and removing the displacements, as disclosed in U.S. Pat. No. 7,841,259, issued Nov. 30, 2010, to Smith et al., the disclosure of which is incorporated herein in its entirety by this reference.

A first discrete cutting element segment 38 may be disposed in the pocket 32. For example, the first discrete cutting element segment 38 may be front-loaded into the pocket 32. A second discrete cutting element segment 40 may be disposed in the pocket 32 with the first discrete cutting element segment 38. For example, the second discrete cutting element segment 40 may be front-loaded into the pocket 32 after the first discrete cutting element segment 38. Front-loading may comprise aligning a central axis of a generally cylindrical discrete cutting element segment (e.g., second discrete cutting element segment 40) with a central axis of a correspondingly generally cylindrical pocket 32 and sliding the discrete cutting element segment into the pocket 32 by moving the discrete cutting element segment in a direction opposing a direction of intended rotation of the earth-boring drill bit 16, as indicated by the arrow in FIG. 3. Accordingly, the first discrete cutting element segment 38 may directly follow the second discrete cutting element segment 40 within the pocket 32 in a direction of intended rotation. Together, the first and second discrete cutting element segments 38 and 40 may form a complete cutting structure 30 in some embodiments. In other embodiments, additional cutting element segments may be included in a complete cutting structure. For example, a complete cutting structure may include two, three, four, five, or even more cutting element segments.

The first discrete cutting element segment 38 may have a first thickness $t_1$. The second discrete cutting element segment 40 may have a second thickness $t_2$. The first thickness $t_1$ may be equal to the second thickness $t_2$ in some embodiments. In other embodiments, the first thickness $t_1$ of the first discrete cutting element segment 38 may be different from (e.g., greater than or less than) the second thickness $t_2$ of the second discrete cutting element segment 40. A distance d between rotationally adjacent blades 24 may be less than the combined thicknesses $t_1$ and $t_2$ of the first and second discrete cutting element segments 38 and 40 in some embodiments. In other words, a width of the junk slot 28 may be less than a thickness of the complete cutting structure 30. Therefore, it may be impossible to front-load a pre-assembled cutting structure 30 into the pocket 32 in such embodiments. Taken individually, however, each of the first and second thicknesses $t_1$ and $t_2$ of the first and second discrete cutting element segments 38 and 40 may be less than the distance d. In other embodiments, the combined first and second thicknesses $t_1$ and $t_2$ of the first and second discrete cutting element segments 38 and 40 may be less than the distance d between rotationally adjacent blades 24. In other words, the thickness of the complete cutting structure 30 may be less than the width of the junk slot 28.

Figure 4:
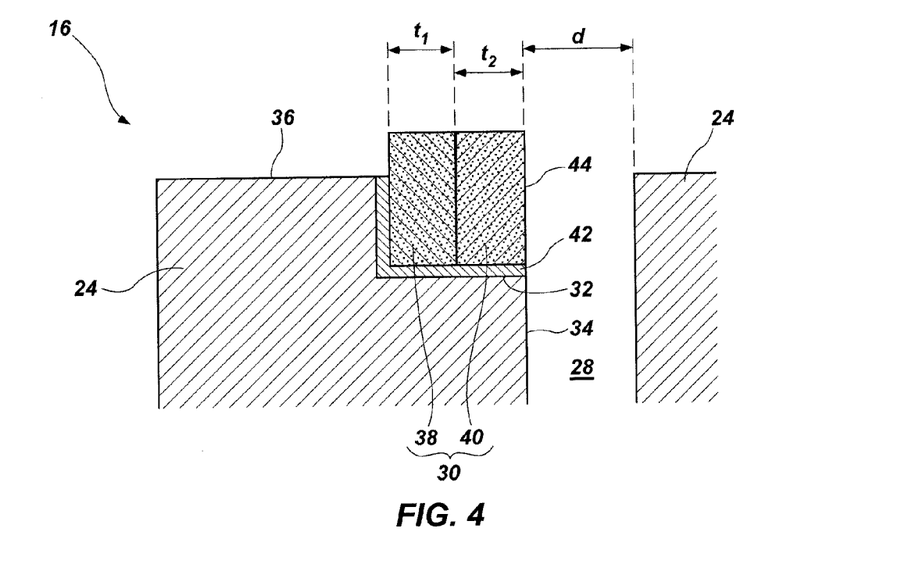
FIG. 4 is a side cross-sectional view of a blade of the drill bit of FIG. 2 after formation of the cutting structure.

Referring to FIG. 4, a side cross-sectional view of the portion of the drill bit 16 of FIG. 3 after formation of the cutting structure 30 is shown. The first and second discrete cutting element segments 38 and 40 may be secured to the blade 24 within the pocket 32 to form the complete cutting structure 30. For example, the first and second discrete cutting element segments 38 and 40 may be brazed, welded, or adhesively bonded within the pocket 32 in some embodiments. The bonding material employed may, of course, depend on the heat sensitivity of the materials of cutting element segments 38 and 40. In such embodiments, the first and second discrete cutting element segments 38 and 40 may only be secured to one another by a braze 42, weld, or adhesive. Therefore, when it is said that the first and second cutting element segments 38 and 40 are discrete, it is meant that the first and second cutting element segments 38 and 40 are not physically connected to one another prior to placement in the pocket 32. In addition, though the first discrete cutting element segment 38 has been described as directly rotationally following the second discrete cutting element segment 40 and is depicted having a rotationally leading surface abutting a rotationally trailing surface of the second discrete cutting element segment 40 at an interface, residual amounts of the braze 42, weld, or adhesive material may be interposed between the first and second discrete cutting element segments 38 and 40. Of course, a braze foil or an adhesive may be disposed between cutting element segments 38 and 40, if desired. In other embodiments, the first and second discrete cutting element segments 38 and 40 may be secured within the pocket 32 using mechanical interference. For example, the first and second discrete cutting element segments 38 and 40 may be secured within the pocket 32 using an interference fit, a shrink fit, or using a pinned connection. In such embodiments, the first and second discrete cutting element segments 38 and 40 may not be physically secured to one another, except through their attachment to the blade 24.

The cutting structure 30 may be exposed above the formation-facing surface 36 of the blade 24 in some embodiments, as shown in FIG. 4. In other embodiments, a cutting structure may be flush with or embedded under the formation-facing surface 36 of a blade 24. A cutting face 44 of the cutting structure 30 may be flush with the rotationally leading surface 34 of the blade 24 to which the cutting structure 30 is secured in some embodiments, as shown in FIG. 4. In other words, the cutting structure 30 may have a neutral or 0° back rake angle and a neutral or 0° side rake angle. In other embodiments, the cutting face of a cutting structure may rotationally lead the rotationally leading surface 34 of a blade 24 to which the cutting structure is secured or may rotationally follow (i.e., be recessed within) the rotationally leading surface 34 of a blade 24 to which the cutting structure is secured. In addition, the cutting face of a cutting structure may be disposed at an oblique angle with respect to the rotationally leading surface 34 of a blade 24 to which it is attached. In other words, the cutting structure may be disposed at a positive or negative back and/or side rake angle. Still further, the cutting face of a cutting structure may not be planar in some embodiments, such as, for example, those cutting faces disclosed in U.S. Patent Application Pub. No. 2010/0307829, published Dec. 9, 2010, to Patel, the disclosure of which is incorporated herein in its entirety by this reference.

The first and second discrete cutting element segments 38 and 40 may comprise materials suitable for use in engaging an earth formation. For example, the first and second discrete cutting element segments 38 and 40 may comprise a diamond-impregnated material, a polycrystalline superhard material, and a tungsten carbide particle-matrix composite material. More specifically, the first and second discrete cutting element segments 38 and 40 may be composed of a ceramic-metallic particle-matrix composite material (i.e., a cermet), such as, for example, a cobalt-cemented tungsten carbide, having diamond particles impregnated (i.e., interspersed) among the cermet material. As a specific, nonlimiting example, the first and second cutting element segments 38 and 40 may have the same material composition, as shown in FIG. 4. In other embodiments, cutting element segments within the same cutting structure may have different material compositions.

Figure 5:
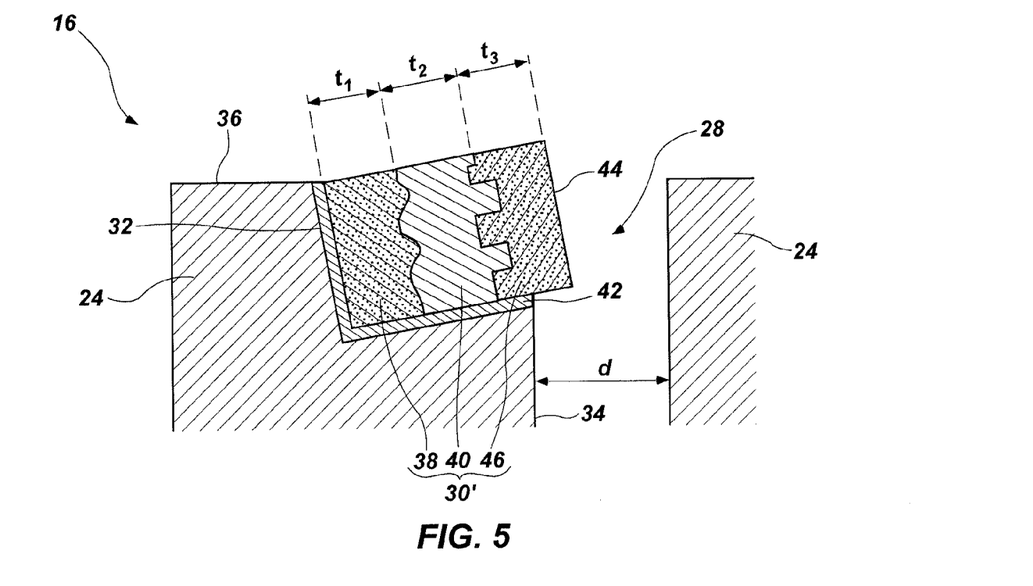
FIG. 5 is a side cross-sectional view of a blade of a drill bit comprising another embodiment of a cutting structure.

Referring to FIG. 5, a side cross-sectional view of a blade 24 of a drill bit 16 comprising another embodiment of a cutting structure 30' is shown. The cutting structure 30' includes a first discrete cutting element segment 38, a second discrete cutting element segment 40, and a third discrete cutting element segment 46. Each of the first, second, and third discrete cutting element segments 38, 40, and 46 is secured to the blade 24 within the pocket 32 using a braze 42.

The first discrete cutting element segment 38 directly rotationally follows the second discrete cutting element segment 40, and the second discrete cutting element segment 40 directly rotationally follows the third discrete cutting element segment 46. The cutting face 44 of the cutting structure 30' may rotationally lead the rotationally leading surface 34 of the blade 24 to which the cutting structure 30' is attached. In addition, the cutting face 44 may be oriented at a negative back rake angle. The combined thicknesses $t_1$, $t_2$, and $t_3$ of the first, second, and third discrete cutting element segments 38, 40, and 46 may be greater than the distance d between rotationally adjacent blades 24, though the individual thicknesses $t_1$, $t_2$, and $t_3$ of the first, second, and third discrete cutting element segments 38, 40, and 46 may be less than the distance d between rotationally adjacent blades 24.

At least one of the discrete cutting element segments 38, 40, and 46 may have a different material composition from at least another of the discrete cutting element segments 38, 40, and 46. For example, the first and third discrete cutting element segments 38 and 46 may have the same material composition and may comprise a diamond-impregnated material. By contrast, the second discrete cutting element segment 40 may have a different material composition from the first and third discrete cutting element segments 38 and 46 and may comprise, for example, a cermet material lacking any superhard material, such as, for example, diamond. In this way, the discrete cutting element segments 38, 40, and 46 may enable the material composition of the cutting structure 30' to vary along the thickness of the cutting structure 30'.

The varying material properties of the discrete cutting element segments 38, 40, and 46 may correspond to varying material properties of an earth formation along an intended drill path for the earth-boring drill bit 16. For example, the intended drill path may pass through a relatively soft and abrasive formation, such as, for example, sand or shale, a relatively hard and brittle formation, such as, for example, rock, and terminate in another relatively soft and abrasive formation. A cutting structure 30' having a leading discrete cutting element segment 46 that is relatively hard and abrasion-resistant, a central discrete cutting element segment 40 that is relatively ductile and fracture-resistant, and a trailing discrete cutting element segment 38 that is relatively hard and abrasion-resistant may be particularly adapted to drill along such a drill path. The particular material composition of a discrete cutting element segment 38, 40, or 46 may be selected or tailored to a particular earth-formation composition, as will be appreciated by those of skill in the art. In other words, rotationally leading discrete cutting element segments 40 and 46 may wear away as different earth formations are encountered to expose rotationally following discrete cutting element segments 38 and 40 that may be particularly adapted to engage the new earth formation being drilled.

Interfaces between the discrete cutting element segments 38, 40, and 46 may be non-planar in some embodiments. For example, the abutting surfaces of the discrete cutting element segments 38, 40, and 46 may comprise complementary protrusions and recesses. Such non-planar interfaces may increase the area of surface contact between the discrete cutting element segments 38, 40, and 46. Therefore, an increased quantity of braze 42 material or adhesive may flow into the interfaces and the connection between the discrete cutting element segments 38, 40 and 46 may be strengthened due to the increased quantity of braze 42 material securing the discrete cutting element segments 38, 40, and 46 to one another. Further, the use of non-planar interfaces may provide greater structural integrity to cutting structure 30' when subjected to drilling stresses in comparison to the use of planar interfaces.

Figure 6:
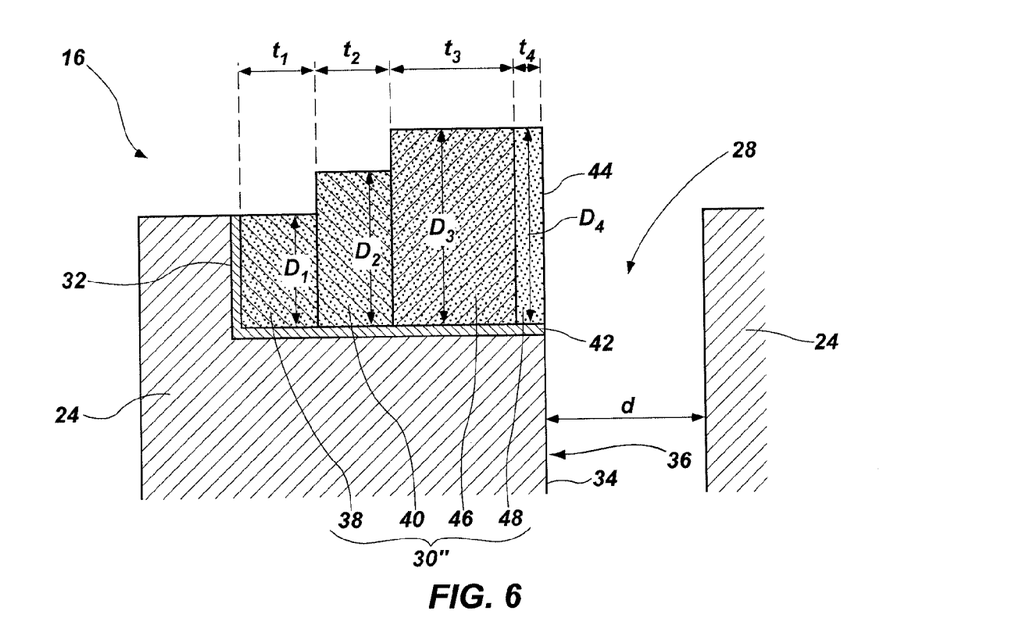
FIG. 6 is a side cross-sectional view of a blade of a drill bit comprising yet another embodiment of a cutting structure.

Referring to FIG. 6, a side cross-sectional view of a blade 24 of a drill bit 16 comprising yet another embodiment of a cutting structure 30" is shown. The cutting structure 30" may comprise a first discrete cutting element segment 38, a second discrete cutting element segment 40, a third discrete cutting element segment 46, and a fourth discrete cutting element segment 48. Each of the first, second, third, and fourth discrete cutting element segments 38, 40, 46, and 48 is secured to the blade 24 within the pocket 32 using a braze 42. The first discrete cutting element segment 38 directly rotationally follows the second discrete cutting element segment 40, the second discrete cutting element segment 40 directly rotationally follows the third discrete cutting element segment 46, and the third discrete cutting element segment 46 directly rotationally follows the fourth discrete cutting element segment 48. The combined thicknesses $t_1$, $t_2$, $t_3$, and $t_4$ of the first, second, third, and fourth discrete cutting element segments 38, 40, 46, and 48 may be greater than the distance d between rotationally adjacent blades 24, though the individual thicknesses $t_1$, $t_2$, $t_3$, and $t_4$ of the first, second, third, and fourth discrete cutting element segments 38, 40, 46, and 48 may be less than the distance d between rotationally adjacent blades 24.

Each of the discrete cutting element segments 38, 40, 46, and 48 may have a different material composition from the others of the discrete cutting element segments 38, 40, 46, and 48. For example, the first discrete cutting element segment 38 may comprise a cermet material lacking any superhard material, such as, for example, diamond. The second discrete cutting element segment 40 may have a different material composition from the first discrete cutting element segment 38 and may comprise, for example, a diamond-impregnated material. The third discrete cutting element segment 46 may have a different material composition from the first and second discrete cutting element segments 38 and 40 and may comprise, for example, a diamond-impregnated material having a greater volume percentage of diamond material than the volume percentage of diamond in the diamond-impregnated cermet material of the second discrete cutting element segment 40. The fourth discrete cutting element segment 48 may have a different material composition from the first, second, and third discrete cutting element segments 38, 40, and 46 and may comprise, for example, a polycrystalline superabrasive material. In other embodiments, discrete cutting element segments may comprise a polycrystalline superabrasive table secured to a substrate, such as, for example, a conventional polycrystalline diamond compact (PDC) cutting element. In this way, the discrete cutting element segments 38, 40, 46, and 48 may enable the material composition of the cutting structure 30" to vary along the thickness of the cutting structure 30", and may enable a discrete cutting element segment 48 of polycrystalline diamond material to be secured in the same pocket 32 as a discrete cutting element segment 40 or 46 of diamond-impregnated material.

At least one of the discrete cutting element segments 38, 40, 46, or 48 may have a diameter $D_1$, $D_2$, $D_3$, or $D_4$ that is different from a diameter $D_1$, $D_2$, $D_3$, or $D_4$ of at least another of the discrete cutting element segments 38, 40, 46, or 48. For example, the first discrete cutting element segment 38 may have a diameter $D_1$ that is smaller than a diameter $D_2$ of the second discrete cutting element segment 40. The diameter $D_2$ of the second discrete cutting element segment 40 may be smaller than a diameter $D_3$ of the third discrete cutting element segment 46. The diameter $D_3$ of the third discrete cutting element segment 46 may be the same as a diameter $D_4$ of the fourth discrete cutting element segment 48. Thus, some discrete cutting element segments 46 and 48 may have the same diameters $D_3$ and $D_4$, while other discrete cutting element segments 38, 40, 46, and 48 may have different diameters $D_1$, $D_2$, $D_3$, and $D_4$ within the same pocket 32. The diameter of the pocket 32 may vary accordingly to accommodate the varying diameter of the cutting structure 30". In addition, the exposure of the cutting structure 30" above the formation-facing surface of the blade 24 to which the cutting structure 30" is secured may vary in a stepped manner due to the different diameters $D_1$, $D_2$, $D_3$, and $D_4$ of the discrete cutting element segments 38, 40, 46, and 48 that form the cutting structure 30". Although the individual discrete cutting element segments 38, 40, 46, and 48 are depicted as being of constant diameter, individual discrete cutting element segments 38, 40, 46, and 48 may have a non-constant diameter in some embodiments. For example, a discrete cutting element segment may have a tapered diameter, which may define a frustoconical shape.

Figure 7:
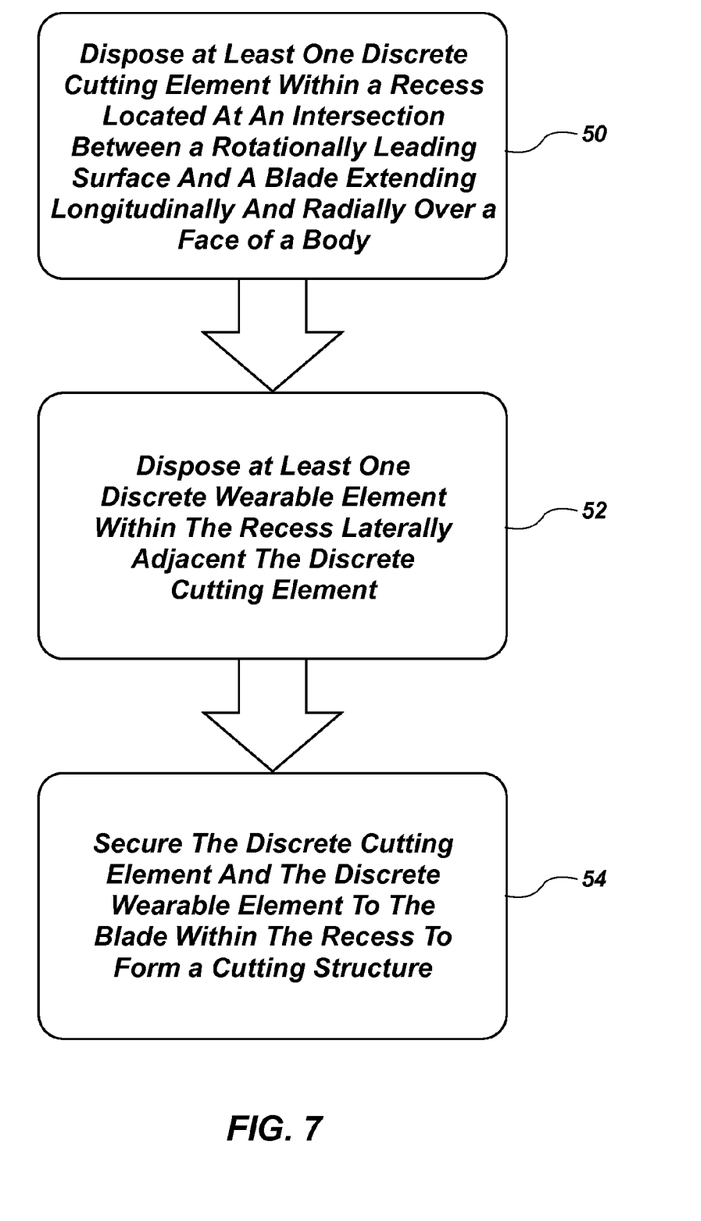
FIG. 7 is a schematic showing acts in another embodiment of a process of forming a cutting structure secured to an earth-boring tool.

FIG. 7 is a schematic showing acts in another embodiment of a process of forming a cutting structure secured to an earth-boring tool. As reflected at 50, at least one discrete cutting element may be disposed within a recess located at an intersection between a rotationally leading surface and a formation-facing surface of a blade extending longitudinally and radially over a face of a body. As shown at 52, at least one discrete wearable element may be disposed within the recess laterally adjacent the at least one discrete cutting element. As depicted at 54, the at least one discrete cutting element and the at least one discrete wearable element may be secured to the blade within the recess to form a cutting structure. Such acts, in addition to other acts that may be performed when forming a cutting structure secured to an earth-boring tool, are described in more detail with reference to the following drawings.

Figure 8:
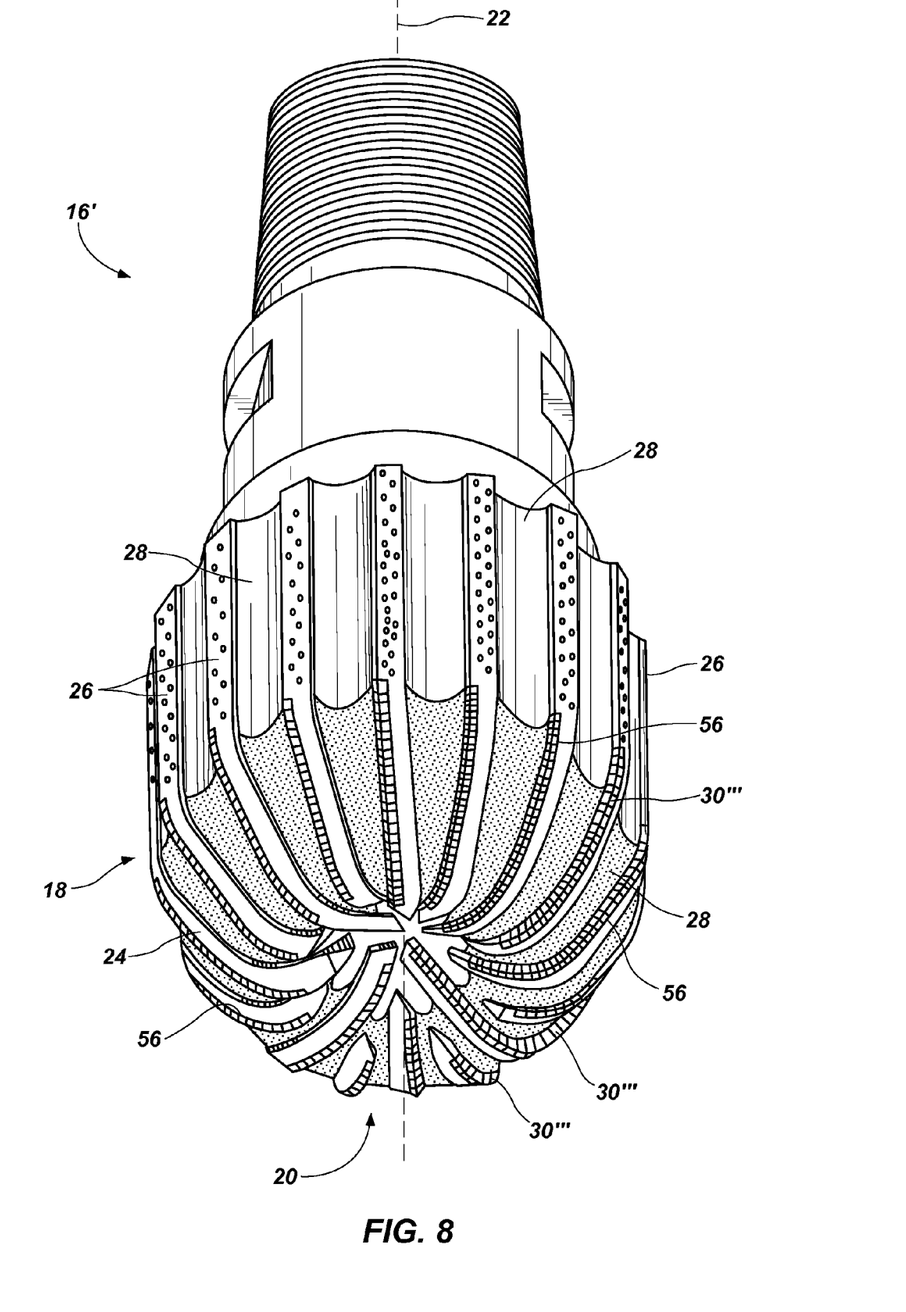
FIG. 8 is a perspective view of another embodiment of an earth-boring drill bit.

Referring to FIG. 8, a perspective view of another embodiment of an earth-boring drill bit 16' is shown. The earth-boring drill bit 16' includes a bit body 18 having a face 20 at a leading end of the earth-boring drill bit 16' and a longitudinal axis 22 (e.g., an axis of rotation, an axis of rotational symmetry, or an axis along a geometric center) extending through the bit body 18. Blades 24 may extend longitudinally downward from the face 20 and radially outward over the face 20. The blades 24 may extend longitudinally upward away from the face 20 to a gage region 26, which may define an outermost diameter of the earth-boring drill bit 16'. Junk slots 28 may be formed by the spaces defined between adjacent blades 24, and cuttings may be carried away from the face 20 through the junk slots 28 as the earth-boring drill bit 16' is rotated in a borehole. Though the earth-boring drill bit 16' is shown as having sixteen blades 24, any number of blades 24 having any thickness may extend from the face 20, and the angular distance between rotationally adjacent blades 24 may vary accordingly. Cutting structures 30'" may be fixedly attached to the blades 24. More specifically, the cutting structures 30'" may be secured within recesses 56 formed in the blades 24. The cutting structures 30'" may be configured to engage and remove an underlying earth formation primarily through a shearing or scraping cutting mechanism.

Figure 9:
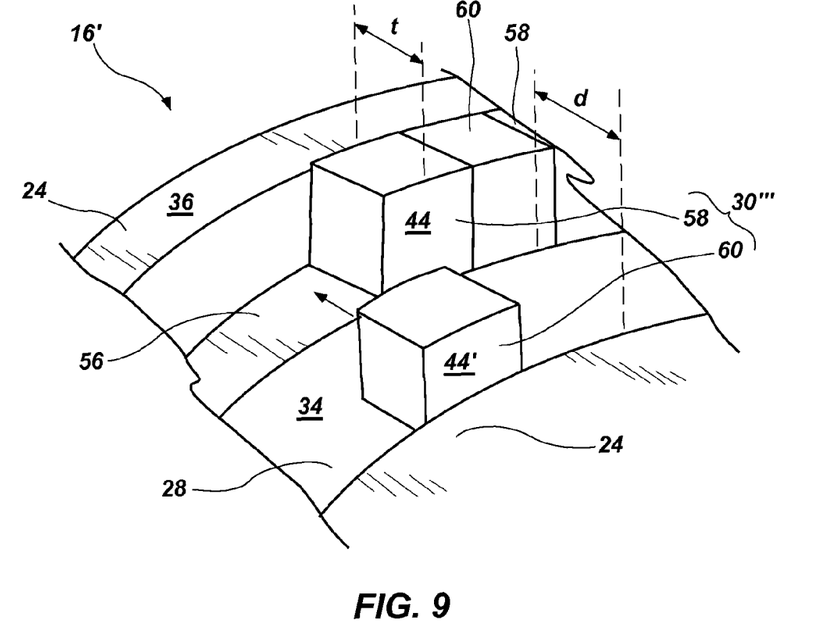
FIG. 9 is a perspective view of a portion of a blade of the drill bit of FIG. 8 during insertion of components of the cutting structure.

Referring to FIG. 9, a portion of a blade of the drill bit of FIG. 8 during insertion components of the cutting structure is shown. A discrete cutting element 58 may be disposed in a recess 56 formed in the blade 24. For example, the discrete cutting element 58 may be disposed in the recess 56 by front-loading or by top-loading the discrete cutting element 58 into the recess 56. A discrete wearable element 60 may be disposed in the recess 56 laterally adjacent the discrete cutting element 58. For example, the discrete wearable element 60 may be disposed in the recess 56 by front-loading, as indicated by the arrow shown in FIG. 9, or by top-loading the discrete wearable element 60 into the recess 56. Together, a single discrete cutting element 58 and a single discrete wearable element 60 may form a complete cutting structure 30' in some embodiments. In other embodiments, a complete cutting structure may include more than one discrete cutting element 58, more than one discrete wearable element 60, or more than one discrete cutting element 58 and more than one discrete wearable element 60.

The recess 56 may be formed along an intersection between a rotationally leading surface 34 and a formation-facing surface 36 of the blade 24. Thus, the recess 56 may extend along what would otherwise be a rotationally leading and outermost edge defined by the intersection between the rotationally leading surface 34 and the formation-facing surface 36 of the blade 24. In other words, the recess 56 may comprise a groove configured and sized to receive at least one discrete cutting element 58 and at least one discrete wearable element 60 in the recess 56 extending along a profile of the blade 24. Because the recess 56 extends along the profile of the blade 24 in a direction at least substantially transverse to a direction of rotation of the drill bit 16' the discrete cutting element 58 may be laterally adjacent the discrete wearable element 60 in the sense that the discrete cutting element 58 is adjacent the discrete wearable element 60 in a direction at least substantially transverse to the direction of rotation of the drill bit 16'.

The discrete cutting and wearable elements 58 and 60 may be generally cubic in shape in some embodiments. For example, surfaces of the cutting and wearable elements 58 and 60 may be generally planar and perpendicular to one another, but some of the surfaces may be curved or contoured to match the contour of the profile of the blade 24 (e.g., curved to abut against a curving surface of the recess 56 or curved to be flush with the curving formation-facing surface 36 of the blade 24). Thus, the recess 56 may comprise two intersecting planes, a formation-facing plane and a perpendicular plane, generally perpendicular to one another against which the discrete cutting and wearable elements 58 and 60 may abut. In other embodiments, the discrete cutting and wearable elements 58 and 60 may have other shapes, such as, for example, generally disc-shaped, generally pyramidal, generally wave-like, etc. In such embodiments, the recess 56 may have a curved or angled shape to match the shape of the discrete cutting and wearable elements 58 and 60 or may retain its shape, a remainder of the recess being filled with material of the braze 42, a weld, or a hardfacing material.

The cutting face 44 of the discrete cutting elements 58 and a leading face 44' of the discrete wearable elements 60 may be flush with the rotationally leading surface 34 of the blade 24 to which the discrete cutting and wearable elements 58 and 60 are attached in some embodiments, as shown in FIG. 9. In such embodiments, the discrete cutting and wearable elements 58 and 60 may be oriented at an at least substantially neutral or 0° back rake angle and/or side rake angle. In other embodiments, the cutting face 44 of the discrete cutting elements 58 and the leading face 44' of the discrete wearable elements 60 may rotationally lead the rotationally leading surface 34 of the blade 24 to which the discrete cutting and wearable elements 58 and 60 are attached, may rotationally trail the rotationally leading surface 34 of the blade 24 to which the discrete cutting and wearable elements 58 and 60 are attached, or may be oriented at negative or positive back rake angles with respect to the rotationally leading surface 34 of the blade 24 to which the discrete cutting and wearable elements 58 and 60 are attached. In addition, the discrete cutting and wearable elements 58 and 60 may be flush with the formation-facing surface 36 of the blade 24 to which the discrete cutting and wearable elements 58 and 60 are attached in some embodiments. In other embodiments, the discrete cutting and wearable elements 58 and 60 may be exposed above or embedded below the formation-facing surface 36 of the blade 24 to which the discrete cutting and wearable elements 58 and 60 are attached.

The discrete cutting and wearable elements 58 and 60 may have a thickness t that is greater than a distance d between rotationally adjacent blades 24 in some embodiments. In such embodiments, the combined space of the junk slot 28 and the recess 56 may enable the discrete cutting and wearable elements 58 and 60 to be placed in the recess 56 by front-loading where front-loading such discrete cutting and wearable elements 58 and 60 would be difficult or impossible without the recess 56. In other embodiments, the discrete cutting and wearable elements 58 and 60 may have a thickness t that is less than the distance d between rotationally adjacent blades 24.

The discrete wearable element 60 may have a greater wear rate than the discrete cutting element 58. Therefore, drilling an earth formation with the cutting structure 30''' may expose a saw tooth-like configuration at the intersection of the rotationally leading surface 34 and the formation-facing surface 36 of the blade 24 because the discrete wearable element 60 may wear away faster than the laterally adjacent discrete cutting element 58 during drilling. Such a cutting structure 30''' may simplify construction of an earth-boring drill bit 16' because formation of a recess 35 along an entire profile of a blade 24 may be faster and easier to accomplish than formation of precise pockets into which the discrete cutting elements 58 may otherwise be placed. In addition, the cutting structure 30''' may simplify construction of the earth-boring drill bit 16' because the discrete cutting elements 58 and discrete wearable elements 60 may be secured to the blade 24 together in groups, which may be faster and simpler than securing individual cutting elements 58 in pockets.

Figure 10A:
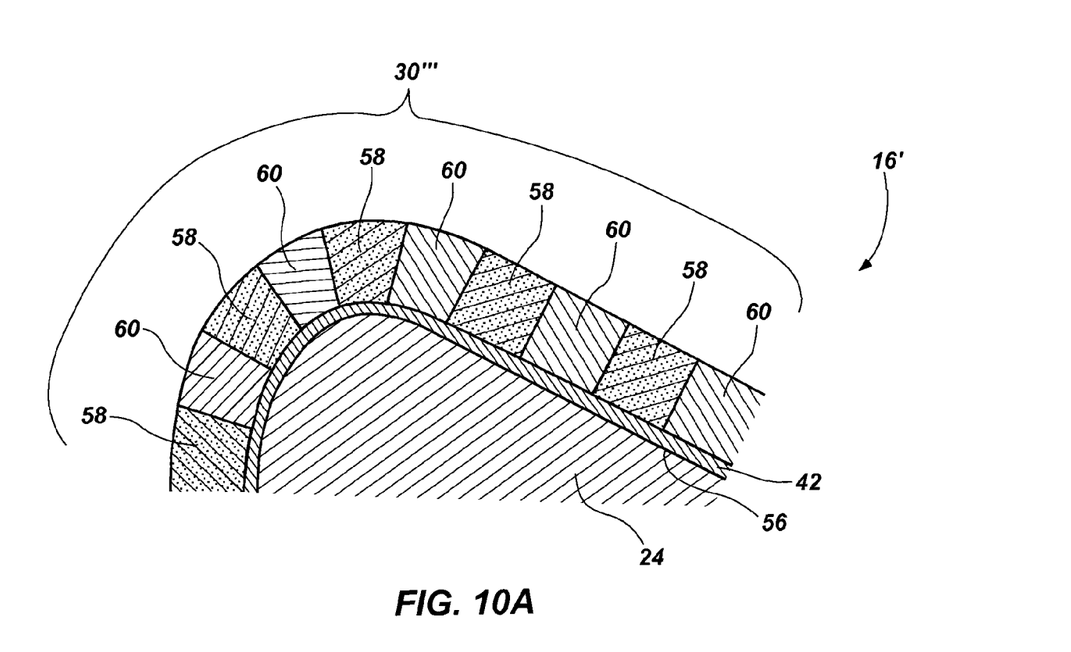
FIG. 10A is a profile cross-sectional view of a blade of the drill bit of FIG. 8 after formation of the cutting structure.

Referring to FIG. 10A, a profile cross-sectional view of a blade 24 of the drill bit 16' of FIG. 8 after formation of the cutting structure 30''' is shown. The cutting structure 30''' may comprise a continuous succession of discrete cutting and wearable elements 58 and 60 secured within the recess 56 formed in the blade 24. The cutting structure 30''' may alternate between discrete cutting elements 58 and discrete wearable elements 60. Thus, each discrete cutting element 58 may be flanked by discrete wearable elements 60 laterally adjacent the discrete cutting element 58 on both sides, with the exception of a discrete cutting element 58 at an end of the cutting structure 30''', which may have only a single discrete wearable element 60 laterally adjacent the discrete cutting element 58, in some embodiments. Likewise, each discrete wearable element 60 may be flanked by discrete cutting elements 58 laterally adjacent the discrete wearable element 60 on both sides, with the exception of a discrete wearable element 60 at an end of the cutting structure 30''', which may have only a single discrete cutting element 58 laterally adjacent the discrete wearable element 58, in such embodiments. In other embodiments, the discrete cutting and wearable elements 58 and 60 may be distributed such that some discrete cutting elements 58 are laterally adjacent other discrete cutting elements 58 and some discrete wearable elements 60 are laterally adjacent other discrete wearable elements 60.

The discrete cutting elements 58 may be formed of a material suitable for cutting engagement with an underlying earth formation. For example, the discrete cutting elements 58 may comprise a diamond-impregnated material, a polycrystalline superhard material, or a superhard polycrystalline table secured to a substrate. The discrete wearable elements 60 may be formed of a material suitable for use in earth-boring applications, but having a greater wear rate than the material of the discrete cutting elements 58 and not specifically intended for cutting engagement with the underlying earth formation. For example, the discrete wearable elements 60 may comprise a metal, a metal alloy, a cermet material, or a diamond-impregnated material having a lower volume percentage of diamonds than a diamond-impregnated material of the discrete cutting elements 58. Thus, the discrete wearable elements 60 may be configured to wear away at a faster rate than the discrete cutting elements 58 to expose a saw tooth-like formation of cutting elements 58 on the blade 24.

The discrete cutting and wearable elements 58 and 60 may be secured to the blade 24 to form the cutting structure 30'''. For example, the discrete cutting and wearable elements 58 and 60 may be secured to the blade 24 using a braze 42 in some embodiments. Thus, when it is said that the discrete cutting and wearable elements 58 and 60 are laterally adjacent one another, it is meant that some residual braze 42 material may be interposed between the discrete cutting and wearable elements 58 and 60. The discrete cutting and wearable elements 58 and 60 may not be secured to one another prior to their placement in the recess 56, and may only be secured to one another by the braze 42 after their placement in the recess 56. In other embodiments, the discrete cutting and wearable elements 58 and 60 may be secured to the blade by, for example, welding, an adhesive, or mechanical interference.

Figure 10B:
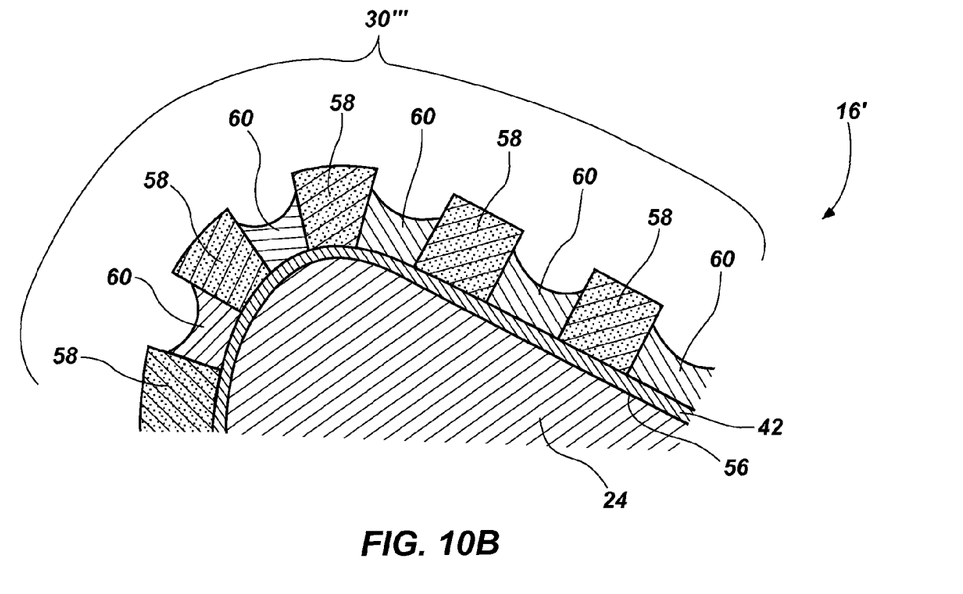
FIG. 10B is a profile cross-sectional view of the blade of the drill bit of FIG. 10A after drilling with the cutting structure.

Referring to FIG. 10B, a profile cross-sectional view of the blade 24 of the drill bit 16' of FIG. 10A after drilling with the cutting structure 30''' is shown. The discrete wearable elements 60 may be worn down to a greater extent than the discrete cutting elements 58 due to the greater wear rate of the discrete wearable elements 60. Thus, the cutting structure 30''' may have a jagged profile after drilling, even though the discrete cutting and wearable elements 58 and 60 were flush with the formation facing surface 36 (see FIG. 9) prior to drilling.

Figure 11:
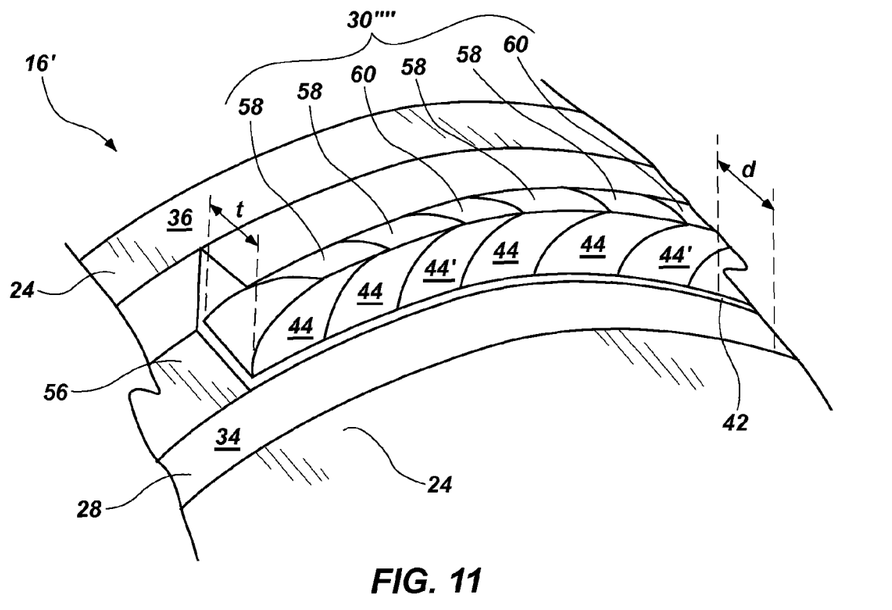
FIG. 11 is a perspective view of a portion of a blade of a drill bit comprising another embodiment of a cutting structure.

Referring to FIG. 11, a portion of a blade 24 of a drill bit 16' comprising another embodiment of a cutting structure 30'''' is shown. The cutting faces 44 of discrete cutting elements 58 and the leading faces 44' of discrete wearable elements 60 may curve forward toward the rotationally leading blade 24 as distance from a bottom surface of the recess 56 increases. Thus, the discrete cutting and wearable elements 58 and 60 may present a changing positive back rake angle. Braze 42 material may fill the gap created between the discrete cutting and wearable elements 58 and 60 due to the curling wave-like shape of the discrete cutting and wearable elements 58 and 60 in some embodiments. In other embodiments, hardfacing material may fill such a gap. The discrete cutting and wearable elements 58 and 60 may be exposed above the formation-facing surface 36 of the blade 24 to which they are attached, as shown in FIG. 11.

The discrete cutting and wearable elements 58 and 60 may not directly alternate in succession, but may form a repeating pattern in some embodiments. For example, two discrete cutting elements 58 may be laterally adjacent one another, followed by a laterally adjacent discrete wearable element 60, which may be repeated in a pattern along the profile of the recess 56. In other embodiments, the discrete cutting and wearable elements 58 and 60 may be placed in other repeating patterns along the profile of the recess 56 or may be dispersed at random along the profile of the recess 56.

Figure 12:
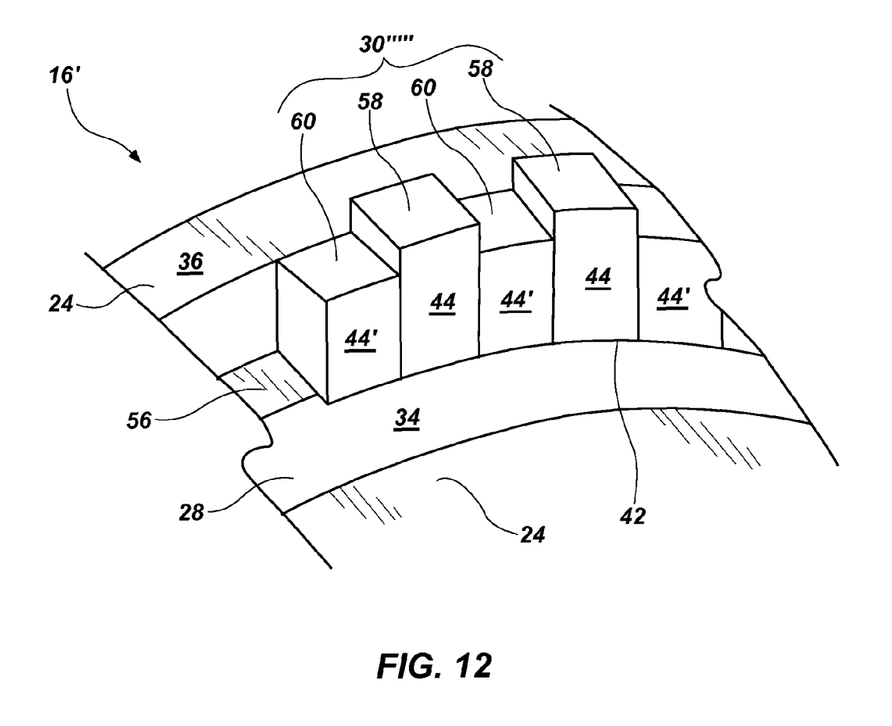
FIG. 12 is a perspective view of a portion a blade of a drill bit comprising yet another embodiment of a cutting structure.

Referring to FIG. 12, a portion of a blade 24 of a drill bit 16' comprising yet another embodiment of a cutting structure 30'''' is shown. The cutting faces 44 of the discrete cutting elements 58 and the leading faces 44' of the discrete wearable elements 60 may rotationally lead the rotationally leading surface 34 of the blade 24 to which the discrete cutting and wearable elements 58 and 60 are attached. At least one of the discrete cutting elements 58 may be exposed above the formation-facing surface 36 of the blade 24 to a greater extent than an extent to which at least one of the discrete wearable elements 60 is exposed. For example, each of the discrete cutting elements 58 may be exposed above the formation-facing surface 36 of the blade 24 and each of the discrete wearable elements 60 may be flush with the formation-facing surface 36 of the blade 24. Thus, the cutting structure 30'''' may have a jagged or saw tooth-like configuration even prior to being deployed in a borehole in such embodiments.

While the present disclosure has been described herein with respect to certain example embodiments, those of ordinary skill in the art will recognize and appreciate that it is not so limited. Rather, many additions, deletions, and modifications to the embodiments described herein may be made without departing from the scope of the invention as hereinafter claimed, including legal equivalents. In addition, features from one embodiment may be combined with features of another embodiment while still being encompassed within the scope of the invention as contemplated by the inventor.

CONCLUSION

In some embodiments, earth-boring tools comprise a body comprising at least one pocket extending into the body. A first discrete cutting element segment is secured within the at least one pocket. At least another discrete cutting element segment is secured within the at least one pocket.

In other embodiments, earth-boring tools comprise a body comprising a face and blades extending longitudinally and radially over the face, at least one of the blades comprising a rotationally leading surface and a formation-facing surface intersecting the rotationally leading surface. At least one discrete cutting element configured for cutting engagement with an underlying earth formation is secured within a recess located at an intersection between the rotationally leading surface and the formation-facing surface. At least one discrete wearable element having a greater wear rate than the at least one discrete cutting element is secured within the recess laterally adjacent the at least one discrete cutting element.

In additional embodiments, methods of forming a cutting structure secured to an earth-boring tool comprise disposing a first discrete cutting element segment into a pocket extending into a body. At least another discrete cutting element segment is disposed into the pocket. The first discrete cutting element segment and the at least another cutting element segment are secured to the body within the pocket to form a cutting structure.

In further embodiments, methods of forming a cutting structure secured to an earth-boring tool comprise disposing at least one discrete cutting element within a recess located at an intersection between a rotationally leading surface and a formation-facing surface of a blade extending longitudinally and radially over a face of a body. At least one discrete wearable element is disposed within the recess laterally adjacent the at least one discrete cutting element. The at least one discrete cutting element and the at least one discrete wearable element are secured to the blade within the recess to form a cutting structure.

What is claimed is:

1. An earth-boring tool, comprising:
   a body comprising blades extending longitudinally and radially over a face of the earth-boring tool and at least one pocket extending from a rotationally leading surface of at least one of the blades into the at least one of the blades;
   a first discrete cutting element segment secured within the at least one pocket; and
   at least another discrete cutting element segment secured within the at least one pocket;
   wherein a distance between the at least one of the blades and another of the blades rotationally adjacent the at least one of the blades is less than a combined thickness of the first discrete cutting element segment and the at least another discrete cutting element segment, and
   wherein a diameter of a rotationally leading one of the first and at least another discrete cutting elements is greater than a rotationally trailing other of the first and at least another discrete cutting elements, causing an exposure of the first discrete cutting element above the at least one of the blades along an interface between the first discrete cutting element and the at least another discrete cutting element to be different from an exposure of the at least another discrete cutting element above the at least one of the blades along the interface, and wherein the at least one pocket comprises a first portion with a diameter corresponding to a diameter of the first discrete cutting element segment and a second portion with a diameter corresponding to a diameter of the at least another discrete cutting element, and wherein a central axis of the first discrete cutting element segment normal to the diameter of the first discrete cutting element is parallel to a central axis of the at least another discrete cutting element segment normal to the diameter of the another discrete cutting element.

2. The earth-boring tool of claim 1, wherein the first discrete cutting element directly rotationally follows the at least another discrete cutting element segment.

3. The earth-boring tool of claim 1, further comprising a third discrete cutting element segment secured within the at least one pocket.

4. The earth-boring tool of claim 3, wherein the at least another discrete cutting element segment directly rotationally follows the third discrete cutting element segment.

5. The earth-boring tool of claim 1, wherein the first discrete cutting element segment and the at least another cutting element segment are secured within the at least one pocket using at least one of a braze, a weld, and an adhesive bond.

6. The earth-boring tool of claim 5, wherein the first discrete cutting element segment and the at least another cutting element segment are secured to one another only by the at least one of the braze, the weld, and the adhesive bond.

7. The earth-boring tool of claim 1, wherein the first discrete cutting element segment comprises a different material composition from a material composition of the at least another discrete cutting element segment.

8. The earth-boring tool of claim 1, wherein the first discrete cutting element segment and the at least another discrete cutting element segment comprise at least one of a diamond-impregnated composite material, a polycrystalline superhard material, and a tungsten carbide particle-matrix composite material.

9. The earth-boring tool of claim 1, wherein a first thickness of the first discrete cutting element segment is different from a second thickness of the at least another discrete cutting element segment.

10. A method of forming a cutting structure secured to an earth-boring tool, comprising:
disposing a first discrete cutting element segment into a pocket extending from a rotationally leading surface of a blade extending longitudinally and radially over a face of the earth-boring tool into the blade, wherein disposing a first discrete cutting element segment into a pocket comprises disposing the first discrete cutting element segment into a portion of the pocket having a diameter corresponding to a diameter of the first discrete cutting element;
disposing at least another discrete cutting element segment into the pocket, wherein disposing at least another discrete cutting element segment into the pocket comprises disposing the at least another discrete cutting element segment into a portion of the pocket having a diameter corresponding to a diameter of the at least another discrete cutting element segment and different from the diameter corresponding to the diameter of the first discrete cutting element, wherein a distance between the blade and another blade rotationally adjacent the blade is less than a combined thickness of the first discrete cutting element segment and the at least another discrete cutting element segment;
orienting the first discrete cutting element segment and the at least another discrete cutting element segment so that a central axis of the first discrete cutting element segment normal to the diameter of the first discrete cutting element segment is parallel to a central axis of the at least another discrete cutting element segment normal to a diameter of the at least another discrete cutting element segment;
rendering an exposure of the first discrete cutting element above the at least one of the blades along an interface between the first discrete cutting element and the at least another discrete cutting element different from an exposure of the at least another discrete cutting element above the at least one of the blades along the interface by selecting a diameter of a rotationally leading one of the first and at least another discrete cutting elements to be greater than a rotationally trailing other of the first and at least another discrete cutting elements; and
securing the first discrete cutting element segment and the at least another cutting element segment to the body within the pocket to form a cutting structure.

11. The method of claim 10, wherein securing the first discrete cutting element segment and the at least another discrete cutting element segment to the body within the pocket comprises brazing, welding or adhesively bonding the first discrete cutting element segment and the at least another discrete cutting element segment to the body within the pocket.

12. The method of claim 10, wherein disposing the first and the at least another discrete cutting element segments into the pocket comprises front-loading the first and the at least another discrete cutting element segments into the pocket, the first discrete cutting element segment rotationally trailing the at least another discrete cutting element.

* * * * *